United States Patent
Cochran

[19]

[11] Patent Number: 6,038,777
[45] Date of Patent: Mar. 21, 2000

[54] METHOD AND APPARATUS FOR SIGHT REDUCTION

[76] Inventor: William Cochran, 1004 Crabtree Cir., New Bern, N.C. 28562

[21] Appl. No.: 09/003,577

[22] Filed: Jan. 6, 1998

Related U.S. Application Data

[60] Provisional application No. 60/034,764, Jan. 6, 1997.

[51] Int. Cl.[7] .............................. G01C 1/08; G01C 17/34
[52] U.S. Cl. ...................... 33/268; 33/431; 235/61 NV; 434/111; 701/200
[58] Field of Search .................................. 33/268, 1 CC, 33/267, 276, 277, 278, 430, 431; 235/61 NV; 434/111; 701/200

[56] References Cited

U.S. PATENT DOCUMENTS

| | | | |
|---|---|---|---|
| 4,197,653 | 4/1980 | Laxo | 33/268 |
| 4,702,011 | 10/1987 | Sigley | 33/268 |
| 4,763,418 | 8/1988 | Decker, Jr. | 33/268 |

*Primary Examiner*—Christopher W. Fulton
*Attorney, Agent, or Firm*—David P. Gordon; David S. Jacobson; Thomas A. Gallagher

[57] ABSTRACT

A sight reduction apparatus includes a sextant, a processor, and a nautical almanac, preferably all provided in an unitary housing. The sextant includes a fixed telescope which is pointed at a known celestial body, and a radial arm is moved against an arc graduated in degrees until a mirror mounted on the sextant reflects an image of the horizon down the telescope to coincide with the known celestial body. The angular elevation of the celestial body, corrected for the exact time and date, gives the position of the user on an imaginary circle. The nautical almanac provides essential data for determining the location of a predetermined list of celestial bodies relative to a fixed location. The processor is programmed to determine the position of a user based upon measurements made with respect to two celestial bodies using the sextant and information provided in the nautical almanac and to further provide the position of a user in terms of latitude and longitude. Preferably, the processor includes a memory having a matrix of data and equations which enable the processor to create a perpetual nautical almanac.

16 Claims, 6 Drawing Sheets

METHOD AND APPARATUS FOR SIGHT REDUCTION

This application claims the benefit of Provisional Application Ser. No. 60/034,764, filed Jan. 6, 1997, which is hereby incorporated by reference herein in its entirety.

BACKGROUND OF THE INVENTION

1. Field of the Invention

This invention relates broadly to an apparatus for determining one's position on the Earth. More particularly, this invention relates to a sight reduction apparatus for determining one's position using measurements done with a sextant.

2. State of the Art

Sextants are commonly used to locate one's position, especially at sea. Current technology to find one's position using a sextant first requires the user to measure the sextant altitude of at least two celestial bodies. The celestial bodies are located in an imaginary circle representative of all the points on Earth from which one could measure the altitude of the celestial bodies. Second, incorporating his/her sextant readings, current time and date, and one's assumed position into a series of multiple look-up tables, a "line of position" with respect to each celestial body is derived. The lines of position are small segments of the imaginary circle close to the assumed position. One's position is found at the intersection of two lines of position, or at the center of a triangle formed at the intersection of three lines of position. Nevertheless, such a method of locating one's position is accompanied by the error inherent in stating one's assumed position. This error is amplified when the angle between any two lines of position is small, e.g., less than approximately thirty degrees.

A more reliable manner of determining one's position is required for an apparatus used as a back up navigation mechanism of a boat's electronic navigation system. Likewise, lifeboat navigation requires a manner of finding navigational fixes which do not depend on knowledge of one's assumed position. When on a life boat at sea, especially for a few days, the position of the boat is far from certain.

In addition, knowledge of one's position in terms of intersecting lines of position is not nearly as preferable as knowledge of one's position in terms of latitude and longitude.

SUMMARY OF THE INVENTION

It is therefore an object of the invention to provide an apparatus for locating one's position which does not require knowledge of one's assumed position.

It is another object of the invention to provide an apparatus for locating one's position which outputs position in terms of latitude and longitude.

It is also an object of the invention to provide an apparatus for locating one's position which includes an internal, perpetual nautical almanac for use therein.

According to one embodiment of a sight reduction apparatus, a sextant is provided with a nautical almanac and a processor means. The sextant is provided for measuring angular distances with respect to the Earth horizon for celestial bodies, e.g., the sun and predetermined stars. The nautical almanac provides essential data for determining the location of a predetermined list of celestial bodies relative to a fixed location. The processor means is programmed to determine one's position based upon measurements made with respect to two celestial bodies using the sextant and information provided in the nautical almanac and to further provide one's position in terms of latitude and longitude.

According to a preferred embodiment of the invention, the processor means includes the nautical almanac in electronic memory located inside the processor means. The processor may also include an electronic calendar and timepiece.

According to another embodiment of the invention, the sextant, the processor means, and the nautical almanac are contained in a unitary apparatus.

With the above embodiments one's position may be determined in terms of latitude and longitude without any reliance upon one's assumed position. In addition, a small angle between the two celestial bodies does not produce error; i.e., celestial bodies in close visual proximity may be used in the sight reduction method of the invention, whereas using celestial bodies in close proximity with the prior art lines of position method would introduce further error into the results of that method.

Additional objects and advantages of the invention will become apparent to those skilled in the art upon reference to the detailed description taken in conjunction with the provided figures.

BRIEF DESCRIPTION OF THE DRAWINGS AND APPENDICES

Figure 5:
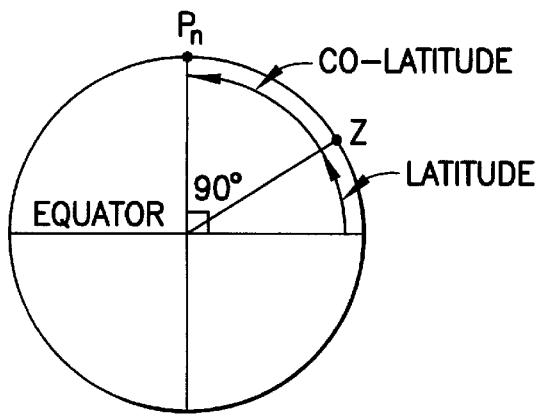

Prior art FIG. 5 illustrates the concepts of latitude and co-latitude.

Figure 6:
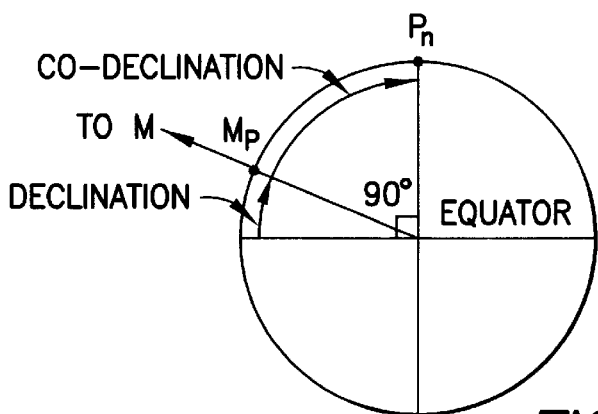

Prior art FIG. 6 illustrates the concepts of declination and co-declination.

Figure 7:
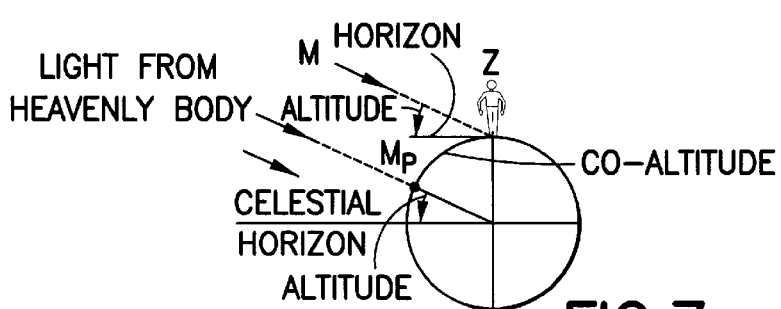

Prior art FIG. 7 illustrates the concepts of altitude and co-altitude.

Figure 8:
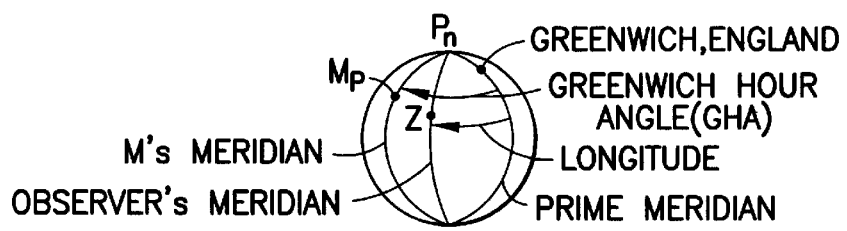

Prior art FIG. 8 illustrates the concept of longitude.

Figure 9:
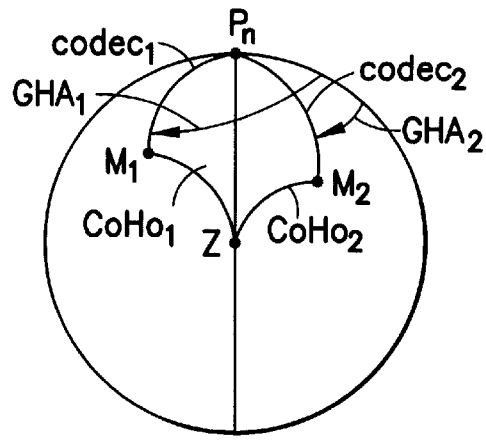

FIG. 9 illustrates various parameters which are used by the processor means of the invention to perform sight reduction according to the invention.

Figure 10:
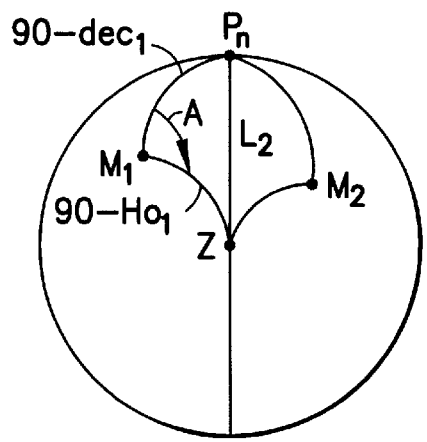
Figure 11:
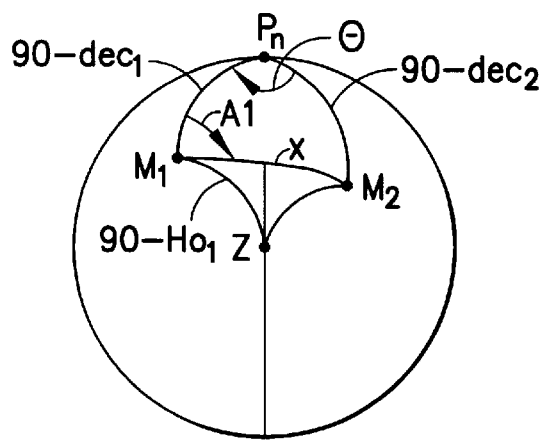
Figure 12:
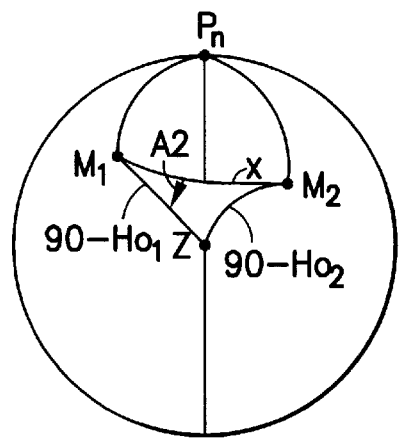

FIG. 10 through 12 illustrate the use of the various parameters shown in FIG. 9 in the sight reduction method performed by the apparatus of the invention.

Figure 13:
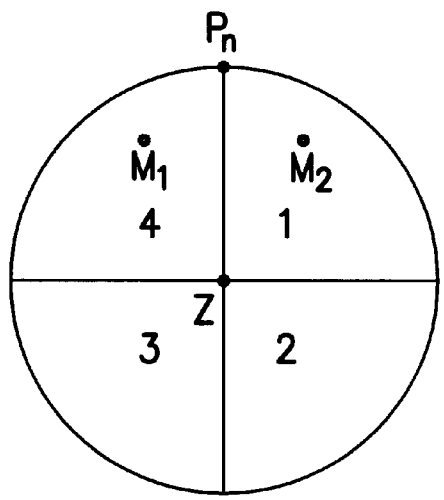

FIG. 13 illustrates the division of the sky into four quadrants according to the sight reduction algorithm performed by the apparatus of the invention.

Appendix 1 is an annotated program listing for a sight reduction program which is run on the processor means of the invention.

Appendix 2 describes the use of the program of Appendix 1.

Appendix 3 is an annotated program listing for an internal nautical almanac for use with the sight reduction program provided in Appendix 1.

DETAILED DESCRIPTION OF THE PREFERRED EMBODIMENTS

Figure 1:
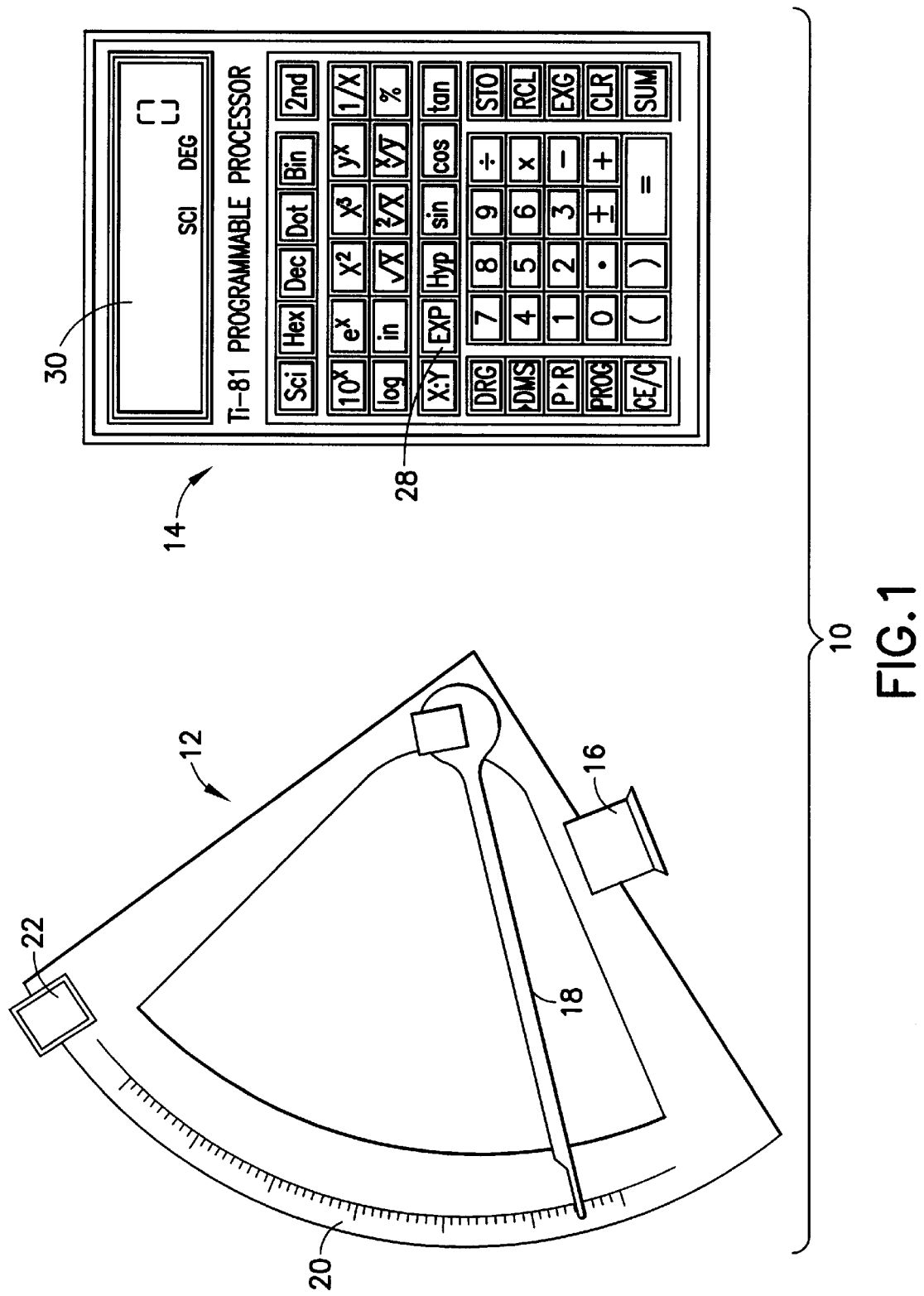
FIG. 1 is a sight reduction apparatus according to a first embodiment of the invention.

Turning now to FIG. 1, a sight reduction apparatus 10 according to a first embodiment of the invention is shown.

Figure 2:
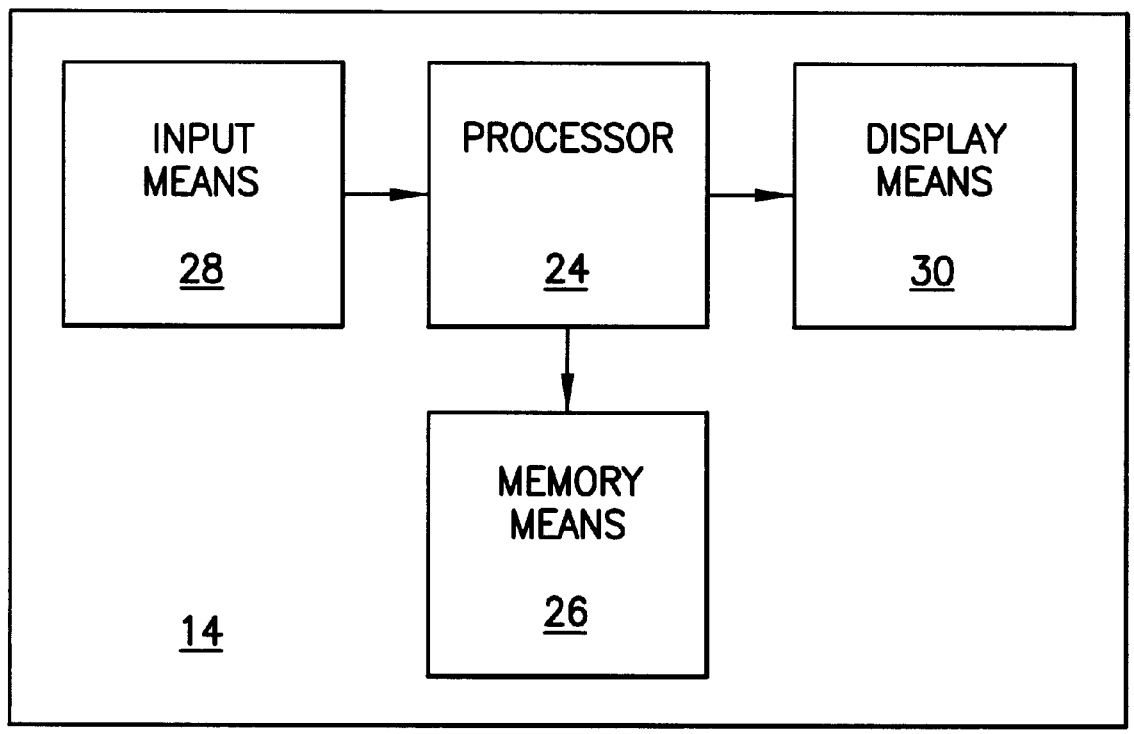
FIG. 2 is a schematic of a processor means according to the first embodiment of the sight reduction apparatus.

The apparatus includes a sextant 12, which is commonly known in the art of navigation, a processor means 14, and a preferably perpetual nautical almanac preferably derivable by or stored in the processor means 14. Generally, the sextant 12 includes a fixed telescope 16 which is pointed at a known celestial body, and a radial arm 18 movable against an arc 20 graduated in degrees until a mirror 22 mounted on the sextant reflects an image of the horizon down the telescope 16 to coincide with the image of the known celestial body. The position of the radial arm 18 indicates the angular elevation, or altitude, of the celestial body. Referring to FIGS. 1 and 2, the processor means 14 preferably includes a processor 24 programmed (or programmable) to perform a sight reduction algorithm as hereinafter described, a memory means 26, e.g. flash RAM, to store data and steps of the algorithm, an input means 28, e.g., a keypad, to provide information to the processor means and the memory means, and a display means 30, e.g. an LCD display. A preferable processing means is a TI-81 programmable handheld processor available from Texas Instruments. The nautical almanac is a long-term nautical almanac for preferably the Sun and twenty-four stars. The nautical almanac is either electronically stored within the processor means 14, or is derivable from data stored in the processor means 14, or is provided in a tangible form such as in a published long range almanac. With reference to the nautical almanac and the current time and date (obtained by means not shown), the Greenwich Hour Angle (GHA) for the appropriate day and the declination (dec) of a celestial body can be obtained. With respect to the person seeking his or her position, the dec and GHA for two celestial bodies, $M_1$ and $M_2$, are determined and input into the processor means 14, and, according to the invention as described hereinafter, the processor means manipulates the GHA and dec along with additional celestial body data from the nautical almanac according to one or more algorithms programmed in the processor means 14. The result of the algorithm(s) and output of the processor means, as described below, is the latitude and longitude of the user.

Figure 3:
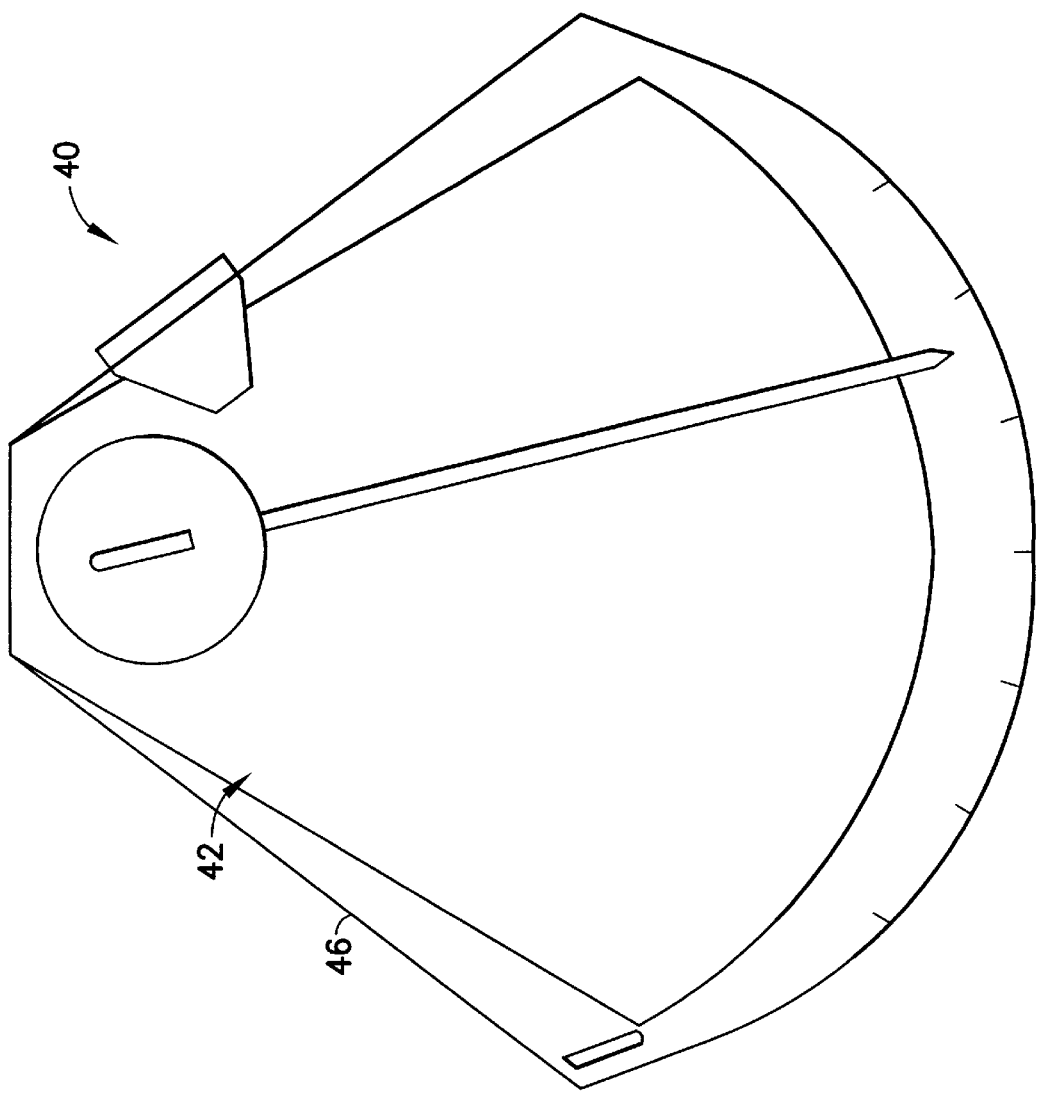
FIG. 3 is a side elevation view of a first side of a sight reduction apparatus according to a second embodiment of the invention.
Figure 4:
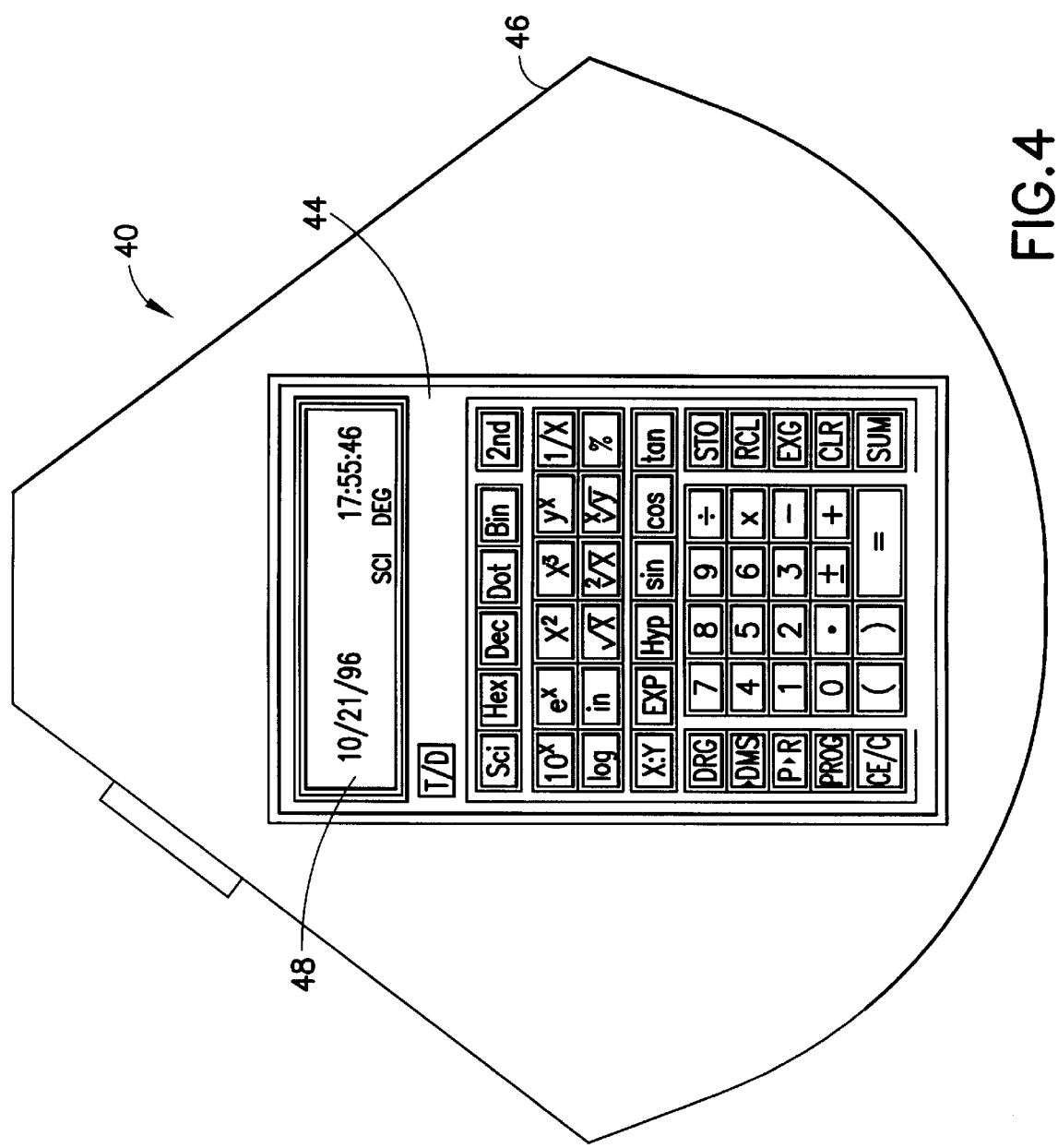
FIG. 4 is a side elevation view of a second side of the sight reduction apparatus shown in FIG. 3.

Referring now to FIGS. 3 and 4, in a second embodiment of a sight reduction apparatus 40 of the invention, the sextant 42 and the processor means 44 share a unitary housing 46. Preferably, the processor means 24 can derive a perpetual nautical almanac from matrices of data stored in electronic memory. Corrective factors and equations necessary to derive the perpetual nautical almanac are found in *American Practical Navigator* published by the Defense Mapping Agency Hydrographic and Topographic Center as Publication No. 9 (and commonly known as 'Bowditch'). The processor means 44 preferably also includes an electronic calendar and timepiece 48.

In order to better explain the algorithm performed by the processor means to provide one's position in terms of latitude and longitude based upon the declination and GHA information for two celestial bodies, it is valuable to provide certain definitions and background information. Referring to FIG. 5, a slice through the center of a sphere, such as the Earth, provides a first circle. The first circle is considered a great circle because the center of the circle lies at the center of the sphere and the radius of the circle is the same as the radius of the sphere. The first circle goes through the zenith point Z on Earth; that is, the point at which a person desires to know his or her position in terms of latitude and longitude. The first circle may also be considered as going through the point on the celestial sphere (an imaginary sphere on which the images of celestial bodies such as the sun, the planets, the moon, and stars are projected) within view and overhead of the position of the person. The first circle is called the principal vertical circle on the celestial sphere. The geographic north pole is designated as Pn. The angle from the equator to point Z is the latitude (L) of Z, and is expressed in degrees north or degrees south and ranges from 0° on the equator to 90° at the north and south poles. The angle between Z and a pole is called the co-latitude (coL); that is, coL=90°−L.

Turning now to FIG. 6, a circle extending through the geographic position $M_p$ of a celestial body (M) (e.g., sun, moon, planet, star) and the north pole Pn is shown. The geographic position $M_p$ of a celestial body M is the projection of the body onto the surface of the Earth on a line between M and the center of the Earth. The circle is called an hour circle of the celestial body on the celestial sphere and the longitudinal position of $M_p$ is called the meridian of longitudiual on Earth of the body M. Traditionally, the angle between the equator and $M_p$ is called declination (dec), rather than latitude, and the angle between M and the pole is called co-declination (codec); therefore, codec=90°−dec.

The sextant is used to measure the altitude (height) of a celestial body M above the horizon. The altitude is expressed in degrees, minutes, and tenths of minutes and is necessary for determining the position of Z. Referring then to FIG. 7, for the purpose of clarity, the zenith Z has been taken as the top of a great circle. The celestial horizon is a line parallel to the horizon seen at Z and, because when body M is a great distance from Earth all light from body M reaching the Earth arrives in essentially parallel rays, the measured altitude can be translated to the celestial horizon. In the situation where the body is not distant, a correction for parallax is made. The measured altitude (Ho)=90°−co-altitude (coHo).

It is also necessary to be familiar with certain terms which are used in the measurement of longitude. Referring to FIG. 8, the Prime Meridian through Greenwich, England is used as the 0° reference longitude. Longitude is measured from 0° to 180° West and 0° to 180° East, the 180° East and 180° West longitude being the same line, and defining the international date line. The Greenwich Hour Angle (GHA) is a surface angle on the Earth which is the longitude of the geographic position Mp of the body M.

Referring back to the invention, to find the latitude and longitude of Z at least two celestial bodies $M_1$ and $M_2$ must be used. Referring to FIG. 9, the following six parameters were selected for determining the position of Z with respect to $M_1$ and $M_2$, $M_1$ being taken as the western-most of the two bodies: $codec_1$ and $codec_2$ distances are 90° minus declination of $M_1$ and $M_2$, respectively; $GHA_1$ and $GHA_2$ are the respective GHAs for the two bodies; and the co-altitude $coHo_1$ and $coHo_2$ distances are 90° less altitude Ho for each of the two bodies. $Ho_1$ and $Ho_2$ are the corrected values of the sextant measurements of altitude for $M_1$ and $M_2$. The corrections are well known and include height of the observer, sextant error, upper limb or lower limb, refraction, and parallax. As discussed above, $GHA_1$, $GHA_2$, $codec_1$, and $codec_2$ are established with reference to a nautical almanac.

Turning to FIG. 10, using observed values or values which can be establish with reference to a nautical almanac, the first objective is to solve a 'zenith distance triangle' to find the latitude $L_z$ of Z by calculating the distance between the Z and the north pole. Using the law of cosines, $cos(L_z)$ can be calculated as follows:

$$cos(L_z)=cos(90-Ho_1)cos(90-dec_1)+sin(90-Ho_1)sin(90-dec_1)cos A \qquad (1)$$

Since cos(90−x)=sin x, and since sin(90−x)=cos x:

$$\cos(L_z)=\sin(Ho_1)\sin(dec_1)+\cos(Ho_1)\cos(dec_1)\cos A. \quad (2)$$

The only parameter which cannot be determined by sextant measurement or from a nautical almanac is angle A. In order to find angle A, according to the invention, angle A is divided into two parts: $A_1$ and $A_2$, as shown in FIGS. 11 and 12, respectively.

Referring to FIG. 11, the arc distance X between $M_1$ and $M_2$ must first be determined to find angle $A_1$. The arc distance X is related to $\Theta$, the angular difference between $GHA_1$ and $GHA_2$. Using the law of cosines:

$$\cos X = \sin(dec_1)\sin(dec_2) + \cos(dec_1)\sin(dec_2)\cos\Theta \quad (3)$$

Then $A_1$ is found by writing a law of cosines equation involving X and $A_1$:

$$\sin(dec_2) = \cos x \sin(dec_1) + \sin X \cos(dec_1)\cos A_1. \quad (4)$$

Solving for $A_1$, $$\cos A_1 = \frac{\sin(dec_2)}{\cos(dec_1)\sin X} - \frac{\tan(dec_1)}{\tan X}. \quad (5)$$

Turning to FIG. 12, $A_2$ is then found using the law of cosines:

$$\sin(Ho_2) = \cos X \sin(Ho_1) + \sin X \cos(Ho_1)\cos(A_2). \quad (6)$$

Using X, which was solved for above in Equation (3), $$\cos A_2 = \frac{\sin(Ho_2)}{\cos(Ho_1)\sin X} - \frac{\tan(Ho_1)}{\tan X}. \quad (7)$$

Angle A is determined by properly combining $A_1$ and $A_2$ from Equations (5) and (7). Based upon principles of spherical trigonometry, the 'proper' combination depends upon the location of $M_1$ and $M_2$ relative to Z. Referring to FIG. 13 and Table 1, the proper combination of $M_1$ and $M_2$ is provided for the various sky quadrant locations of $M_1$ and $M_2$ with respect to Z. It will be appreciated that no proper combination can be made when $M_1$ is in quadrant 1 or 2 and $M_2$ is in quadrant 3 or 4 as such a combination would put $M_1$ west of $M_2$; as stated above, $M_1$ must be considered to be the more eastern of $M_1$ and $M_2$.

TABLE 2

Calculation of Angle A based on location of $M_1$ and $M_2$.

| $M_1$ Quadrant | $M_2$ Quadrant | Angle A = |
|---|---|---|
| 4 | 4 | $A_1 + A_2$ |
| 4 | 3 | $|A_1 - A_2|$ |
| 4 | 2 | $A_1 + A_2$ |
| 4 | 1 | $A_1 + A_2$ |
| 3 | 4 | $A_1 + A_2$ |
| 3 | 3 | $|A_1 - A_2|$ |
| 3 | 2 | $|A_1 - A_2|$ |
| 3 | 1 | $|A_1 - A_2|$ |
| 2 | 4 | — |
| 2 | 3 | — |
| 2 | 2 | $|A_1 - A_2|$ if $M_2$ is north of $M_1$; $360-(A_1 + A_2)$ if $M_2$ is south of $M_1$ |
| 2 | 1 | $|A_1 - A_2|$ |
| 1 | 4 | — |
| 1 | 3 | — |

TABLE 2-continued

Calculation of Angle A based on location of $M_1$ and $M_2$.

| $M_1$ Quadrant | $M_2$ Quadrant | Angle A = |
|---|---|---|
| 1 | 2 | $360 - (A_1 + A_2)$ |
| 1 | 1 | $|A_1 - A_2|$ if $M_2$ is north of $M_1$; $360-(A_1 + A_2)$ if $M_2$ is south of $M_1$ |

Now that A can be found, Equation (2) can be solved for $L_z$, the zenith distance for Z. The latitude of Z is then $$L=90-L_z. \quad (8)$$

If L is positive, the latitude is north. If L is negative, the latitude is south and $$L=L_z-90. \quad (9)$$

The longitude of Z, the angle t between the meridian of Z and the GHA of $M_1$, can now be determined using the law of cosines:

$$\sin(Ho_1)=\sin(dec_1)\cos(L_z)+\cos(dec_1)\sin(L_z)\cos(t). \quad (10)$$

Solving Equation (8) for cos(t), $$\cos(t) = \frac{\sin(Ho_1)}{\cos(dec_1)\sin(L_z)} - \frac{\tan(dec_1)}{\tan(L_z)}. \quad (11)$$

If $M_1$ is west of Z, then $$Lo=GHA_1-t. \quad (12)$$

If $M_1$ is east of Z, then $$Lo=GHA_1+t. \quad (13)$$

Based upon the above described figures and equations, the sight reduction algorithm performed with the processor means 14 (or 44) can be summarized as follows. First, according to the time and date of the sight reduction, the GHA and declination for two celestial bodies $M_1$ and $M_2$ (wherein $M_1$ is west of or has the same GHA as $M_2$) are established from a nautical almanac and input into the processor means. Second, sextant readings of $M_1$ and $M_2$ are made and $Ho_1$ and $Ho_2$, the corrected sight information from sextant readings and the nautical almanac, are input into the processor. Third, $\Theta$ is set as the difference between the $GHA_1$ and $GHA_2$. If $\Theta$ is negative, then $GHA_2=GHA_2-360$. Fourth, the arc distance X between $M_1$ and $M_2$ is calculated according to Equation (3). Fifth, based upon the arc distance X, angle $A_1$ is calculated using Equation (5), and angle $A_2$ is calculated using Equation (7). Sixth, with reference to Table 1, angles $A_1$ and $A_2$ are properly combined according to their quadrant location relative to Z. Seventh, the zenith distance $L_z$ is calculated using Equation (2), and the latitude of Z is then calculated using Equation (8) and (9). Eighth, the angle t between $M_1$ and Z is calculated using Equation (11). Finally, the longitude of Z is calculated using Equations (12) and (13). An annotated program listing for the sight reduction algorithm performed by the processor means is attached hereto as Appendix 1, and the use of this particular program is described in Appendix 2, both of which are hereby incorporated by reference herein in their entireties.

In addition, according to preferred aspect of the invention and as briefly discussed above, a perpetual nautical almanac may be provided in memory in the processor means 14 (or 44) for use with the program. The nautical almanac is preferably derivable by the processor means from an algorithm which uses predetermined matrices of data for select celestial bodies to determine the Greenwich Hour Angle (GHA) and declination (dec) for the selected celestial bodies at a particular time and date and from a predetermined reference point. The program listing for a preferred algorithm for the nautical almanac is provided in Appendix 3, which is hereby incorporated by reference herein in its entirety.

The algorithm for generating a nautical almanac generally includes the following steps. The year, month, date, and time of sight are input into the processor means. The time of the sight is preferably provided in Greenwich Mean Time in an HHMM.SS format. As an example to explain the preferred algorithm, the Sun and another star are used as the celestial bodies $M_1$ and $M_2$, respectively. (It will be appreciated that when the Sun is used as one of the celestial bodies, i.e., a daytime reading, and a night sky celestial body is used as the other celestial body, corrections must be made to correct for relative movement of the person between the readings and the difference in time between readings. These corrections are included in the nautical almanac equations of Appendix 3). With respect to the first celestial body $M_1$, the time is converted to an angle for the GHA and the date is converted to a 'day number' with respect to a four year cycle. The algorithm then calls almanac equations described in Appendix 3, which have been preferably previously stored in the memory of the processor means, which match the GHA and dec of the Sun in Publication No. 9 of the Defense Mapping Agency, also known as Bowditch. Based on the almanac equations and the day number, the GHA and dec are calculated with respect to a quadrennial correction (correcting error or 'drift' caused by leap years and gravitational effects of the moon upon the Earth). With reference again to Appendix 3, the GHA and dec, together with the drift corrective factors, are preferably included in matrices in the memory of the processor means.

Next, the GHA and dec are calculated with respect to a second celestial body $M_2$, such as a star. In order to find the GHA of a star, the sidereal hour angle (SHA) of the star is added to the GHA of Aries; i.e., GHA(Aries)+SHA(star)= GHA(star). A first matrix of the GHA of Aries (see Appendix 3, page 3) is provided to the memory 26 of the processor means 14. In addition, an indexed second matrix (see Appendix 3, page 5) containing the SHA of twenty-four stars and SHA correction factors for the day number, and a correspondingly indexed third matrix containing the dec for the twenty-four stars and dec correction factors for the day number are also provided into the memory of the processor means. Using the first matrix and the algorithm described above with respect to the $M_1$, the GHA of Aries is similarly determined. Next, the index number relating to the celestial body $M_2$ is input into the processor means (that is, if, for example, the star Arcturus is being used as $M_2$, and Arcturus has a matrix index number of 7, then 7 is input via the input means 28 to the processor 24 to call the matrix data for Arcturus from memory 26). Based upon the input index number, the algorithm extracts the SHA and dec of the $M_2$. The algorithm then corrects the SHA for drift and adds the GHA of Aries to the SHA of the star. Likewise, the dec for $M_2$ is corrected for drift. The GHA and dec for $M_1$ and $M_2$ are then callable by the sight reduction algorithm, described above, to provide the position of a user in terms of latitude and longitude.

It will therefore be appreciated that with the above embodiment the position of a user of the sight reduction apparatus of the invention may be determined in terms of latitude and longitude without any reliance upon an assumed position, and the inherent error and limitations associated therewith.

There have been described and illustrated embodiments of a sight reduction apparatus and a method of using the apparatus to determine one's position in terms of latitude and longitude. While particular embodiments of the invention have been described, it is not intended that the invention be limited thereto, as it is intended that the invention be as broad in scope as the art will allow and that the specification be read likewise. Thus, while a particular preferred processing means has been disclosed, it will be appreciated that other processing means may be used as well. For example, portable computers, personal digital assistants (PDAs), and other calculator-type devices may be used as well. Furthermore while the step of the various algorithms are preferably provided in a memory of the processor means, it will be appreciated that the steps of the algorithm may be input each time the sight reduction apparatus is used. In addition, while in an example, the Sun and another star are used as the celestial bodies, it will be appreciated that other celestial bodies such as planets and the moon may likewise be used. It will therefore be appreciated by those skilled in the art that yet other modifications could be made to the provided invention without deviating from its spirit and scope as so claimed.

I claim:

1. A sight reduction apparatus for determining the position on the Earth of a user with respect to first and second celestial bodies, comprising:
    a) a sextant means for measuring an altitude of each of the first and second celestial bodies;
    b) means for determining an hour angle with respect to a known meridian and a declination for each of the first and second celestial bodies; and
    c) processing means for calculating the position of the user relative to the first and second celestial bodies based on parameters which consist essentially of said altitudes, said hour angles and said declinations of each of the first and second celestial bodies.

2. A sight reduction apparatus according to claim 1, wherein:
    said processing means has a memory means for storing data, and said means for determining is derivable from said processing means from at least one matrix of celestial body data and at least one equation stored in said memory means.

3. A sight reduction apparatus according to claim 1, wherein:
    said hour angle with respect to a known meridian is a Greenwich Hour Angle.

4. A sight reduction apparatus according to claim 3, wherein:
    said at least one matrix includes the Greenwich Hour Angle of Aries over a four year cycle.

5. A sight reduction apparatus according to claim 4, wherein:
    said at least one matrix includes sidereal hour angles and declinations for a plurality of celestial bodies.

6. A sight reduction apparatus according to claim 5, wherein:
    said at least one matrix further includes temporal corrective factors for said sidereal hour angle and declinations for said plurality of celestial bodies.

7. A sight reduction apparatus according to claim 1, wherein:

said processing means includes a calculating means for manipulating data, a memory means for storing data, an input means for providing data to at least one of the processor and the memory means, and a display means for displaying the manipulated data to the user.

8. A sight reduction apparatus according to claim 1, wherein:

said sextant, said means for measuring the altitude, and said processing means are provided in a unitary housing.

9. A method for determining the position of a person based on sextant observation by the person of first and second celestial bodies from the position, comprising:

a) determining the co-altitude of the first celestial body and the co-altitude of the second celestial body;

b) for the first celestial body, determining a first declination and a first angular distance of a meridian of the first celestial body with respect to a known meridian on an imaginary sphere on which said first and second celestial bodies are imaged;

c) for the second celestial body, determining a second declination and a second angular distance of a meridian of the second celestial body with respect to the known meridian on the imaginary sphere;

d) calculating a first angle formed at the intersection of a first arc and a second arc on the imaginary sphere, the first arc extending between the first celestial body and the position of the person, and the second arc extending between the first celestial body and the north pole;

e) based on said first angle, determining the latitude of the person;

f) calculating an arc distance on said imaginary sphere between the first and second celestial bodies by using the declination, co-altitude, the relative angle between the first angular distance and the second angular distance; and g) based on said arc distance, determining the longitude of the person.

10. A method according to claim 9, wherein:

said determining co-altitude comprises using a sextant to determine the altitude of the first and second celestial bodies, and subtracting the altitude from 90° to result in the altitude.

11. A method according to claim 9, wherein:

said determining co-altitude further comprises applying correcting factors to the determined altitude.

12. A method according to claim 9, wherein:

said determining the first declination and the first angular distance comprises providing a nautical almanac and establishing the first declination and the first angular distance from the nautical almanac, and said determining the second declination and the second angular distance comprises establishing the second declination and the second angular distance from the nautical almanac.

13. a method according to claim 12, further comprising:

h) providing a processor means for at least one of storing and deriving a nautical almanac.

14. A method according to claim 9, wherein:

said calculating said arc distance comprises relating the first and second celestial bodies relative to each other with respect to four quadrants which meet over the position of the person.

15. A method for determining the position of a person based on sextant observation by the person of first and second celestial bodies from the position, comprising:

locating the first and second celestial bodies relative to the person and relative to each other on an imaginary sphere; and based on said locating, solving a zenith distance triangle between the person and the first and second celestial bodies to provide the position of the person in terms of latitude and longitude.

16. A sight reduction apparatus for determining the position on the Earth of a user with respect to first and second celestial bodies, comprising:

a) a sextant means for measuring an altitude of each of the first and second celestial bodies;

b) means for determining an hour angle with respect to a known meridian and a declination for each of the first and second celestial bodies; and c) processing means for calculating the position of the user relative to the first and second celestial bodies based on parameters including said altitudes, said hour angles and said declinations of each of the first and second celestial bodies, said processing means not utilizing a parameter of an assumed or approximate position.

* * * * *

UNITED STATES PATENT AND TRADEMARK OFFICE
CERTIFICATE OF CORRECTION

PATENT NO. : 6,038,777
DATED : March 21, 2000
INVENTOR(S) : William Cochran

Page 1 of 14

It is certified that error appears in the above-identified patent and that said Letters Patent is hereby corrected as shown below:

Insert the following Appendices 1, 2, and 3:

Signed and Sealed this

Fourth Day of September, 2001

*Attest:*

*Attesting Officer*

NICHOLAS P. GODICI
*Acting Director of the United States Patent and Trademark Office*

APPENDIX 1

Sight Reduction Program

XCELPO Listing

This is the listing for a sight reduction program written on a TI-81 programmable hand-held processor. It includes calls to other programs for the calculation of certain variables and access to the perpetual almanac.

<u>Program 1 XCELPO</u>

| | |
|---|---|
| 0 → X | Set X to recall answer to Almanac question |
| ClrHome | Clear the display screen |
| Disp "EX ALMANAC?" | Are you going to use your own almanac? |
| Input Z | |
| If Z=1 | |
| Goto 3 | If Z is one, an external almanac is used for LOP or FIX |
| Prgm7 | Find GHA and DEC for SUN or Stars (Prgm7: SUNQUES) |
| R → A | GHA of the first body (GHA1) |
| Z → C | DEC of the first body (DEC1) |
| Lbl3 | From "yes" for the external almanac |
| Disp "LOP?" | For an Line of Position (LOP) with external or internal almanac |
| Input Z | |
| If Z=1 | Prgm6: LOP is listed below |
| Prgm6 | Program 6 is used for the LOP calculation and the program stops |
| If X=0 | External Almanac? |
| Goto Θ | Yes, skip the next body input |
| Prgm7 | Find GHA and DEC for SUN or Stars (Prgm7: SUNQUES) |
| R → B | GHA of the second body (GHA2) |
| Z → D | DEC of the second body (DEC2) |
| Goto 4 | Skip manual input of data |
| Lbl Θ | |
| Prgm9 | Input GHA1, DEC1 |
| ClrHome | Clear the display screen |
| Disp "GHA2" | Note to enter GHA of 2nd body, M2 |
| Pgm2 | Input data for "DEGREES" and "MINUTES", returns S |
| Ans → B | Store GHA2 as B |
| if (A-B)<0 | GHA2 is greater than GHA1 |
| B-360→B | Make the angle between A and B positive |
| Disp "DEC2" | Note to enter Declination of M2 |
| Pgm2 | Input data for "DEGREES" and "MINUTES", returns S |
| Ans → D | Store DEC2 as D |
| Lbl 4 | From "no" for the external almanac; internal was used |
| Disp "H1" | Corrected Sextant measurement for M1 |
| Prgm2 | Input data for "DEGREES" and "MINUTES", returns S |
| Ans → E | Store $H_o1$ in E |
| Disp "HO2=" | Corrected sextant measurement on M2 |

| | |
|---|---|
| Prgm2 | Input data for "DEGREES" and "MINUTES", returns S |
| Ans → F | Store $H_o2$ as F |
| Deg | Set the mode of operation to degrees (as opposed to radians) |
| $\cos^{-1}(\sin C \sin D + \cos C \cos D \cos(A-B)) \to \Theta$ | calculate the arc distance between the GPs for $M_1$ and $M_2$ |
| ClrHome | Clear the display screen |
| $(\sin D/(\cos C \sin\Theta))-\tan C/\tan\Theta$ | Calculate angle A1 |
| $\cos^{-1}$Ans → W | Put W into degrees |
| $(\sin F/\cos E \sin\Theta))-\tan E/\tan\Theta$ | Calculate angle A2 |
| $\cos^{-1}$Ans → Z | Put Z into degrees |
| Disp "M1 QUADRANT" | |
| Input G | Store the entry in G (Quadrant = G) |
| If G>2 | G is 3 or 4, try location 1. |
| Goto 1 | |
| Disp "$M_2$ NORTH OF $M_1$?" | |
| Input Q | Store the response in Q |
| if Q=1 | |
| abs (W-Z)→H | Store the absolute value of the difference between $A_1$ and $A_2$ in H |
| if Q≠1 | |
| 360-(W+Z)→H | Store this combination of A1 and A2 in H for Q ≠1 |
| goto F | Start normal calculations |
| Lbl 1 | G must be 3 or 4 |
| If G=3 | If it is 3, go below to label 2, G must be 4 |
| Goto 2 | |
| Prgm3 | Find the quadrant for $M_2$ (see below) |
| if Q=3 | |
| abs (W-Z)→H | Store the absolute value of the difference between $A_1$ and $A_2$ in H |
| if Q≠3 | |
| W+Z→H | Add $A_1$ and $A_2$ otherwise |
| Goto F | Start normal calculations |
| Lbl 2 | |
| Prgm3 | Find the quadrant for $M_2$ (see below) |
| If Q=4 | |
| W+Z→H | Add $A_1$ and $A_2$ for this condition |
| if Q≠4 | |
| abs (W-Z)→H | Subtract them otherwise |
| Lbl F | Start of displays for Latitude and Longitude |
| ClrHome | Clear the display screen |
| Prgm8 | For polar distance (Prgm8: ARC.EQ, see below) |
| $\cos^{-1}$Ans → L | Polar distance to zenith in L |
| if L≥90 | Polar distance below the equator |
| goto 5 | Handle this case in label 5 |
| 90-L→ Q | store longitude in Q |

| | |
|---|---|
| Disp "LAT N=" | Ready to display answer for latitude |
| goto 6 | |
| Lbl 5 | for south latitude |
| L-90→Q | store latitude in Q |
| Disp "LAT S=" | Ready to display answer for latitude |
| Lbl 6 | |
| Fix 0 | |
| IPart Q | Integer part of M for degrees |
| Disp Ans | Display latitude degrees |
| Disp "DEG." | |
| FPart Q | Fractional part of Q for minutes |
| Ans*60 | Convert fraction to minutes |
| Fix 1 | Display a minutes to the nearest tenth |
| Disp Ans | Display latitude minutes |
| Disp "MIN." | |
| Pause | Show display for until user hits "Enter" |
| ClrHome | Clear display |
| Prgm0 | Program0: ANGLE.EQ to calculate longitude |
| Ans→P | Store the angle in P |
| if G<3 | $M_1$ is East of Z and that is handled in label 7 |
| goto 7 | |
| A-P→P | GHA1 - angle P = Longitude |
| goto 8 | |
| Lbl 7 | |
| A+P→P | GHA1 + angle P = Longitude |
| Lbl 8 | |
| P→Q | An aid to provide the "else" function |
| abs P→P | Make P positive. |
| if Q<0 | Was P negative? If so, go to G for east |
| goto G | |
| if P>180 | East Longitude handled in label 9 |
| go to 9 | |
| Disp "LONG. W=" | Ready to display West Longitude |
| goto E | Display it |
| Lbl 9 | |
| 360-P→P | For East Longitude |
| Lbl G | P was negative, must be East Longitude |
| Disp "LONG. E=" | Ready to display East Longitude |
| Lbl E | |
| Fix 0 | |
| IPart P | Integer part of P for degrees |
| Disp Ans | Display longitude degrees |
| Disp "DEG." | |
| FPart P | Fractional part of P for minutes |
| Ans*60 | Convert fraction to minutes |
| Fix 1 | Display minutes to the nearest tenth |

| | |
|---|---|
| Disp Ans | Display longitude minutes |
| Disp "MIN." | End is a default for the program |

Program 2 DEGMIN

| | |
|---|---|
| Disp "DEG." | |
| Input S | Input number of degrees |
| Disp "MIN." | |
| Input Q | Input number of minutes and tenths of minutes |
| if S<0 | |
| -Q→ Q | If the degrees are negative, the minutes must be also |
| Q/60 + S | Convert to degrees, return the value to calling Program |

Program 3 M2INP

| | |
|---|---|
| Disp "WHAT QUADRANT" | |
| Disp "FOR M2?" | |
| Input Q | Store the value (1,2,3 or 4) in Q as was done for M1 |

Program 6 LOP

| | |
|---|---|
| ClrHome | Clear the display screen |
| If X = 1 | Programed almanac is used |
| Goto A | GHA and DEC are already calculated |
| Prgm9 | Input Almanac data for LOP calculation |
| Lbl A | |
| ClrHome | Clear the display screen |
| Disp "H1" | Corrected Sextant measurement for M1 |
| Prgm2 | Input data for "DEGREES" and "MINUTES" |
| Ans → T | Store $H_o 1$ in T |
| Disp "DR LAT." | Dead Reckoned position Latitude input |
| Prgm2 | See above |
| Ans → K | Store Lat. in K |
| 90-K → L | Co-Lat is used in Prgm0 |
| K → E | Store in E for Prgm8 |
| Disp "DR LONG." | Dead Reckoned position Longitude input |
| Prgm2 | See above |
| Ans → B | Store Long. in B |
| abs (A-B) → H | A is GHA of body, B is DR Long. for future calculation |
| Deg | |
| Prgm8 | See below |
| $sin^{-1}$ Ans → E | Value for $H_c$, the computed altitude |
| Prgm0 | Calculation of Zenith angle |
| Ans → Z | Store the angle in Z |
| If A>B | If GHA body is greater than the DR Latitude |
| 360-Z → Z | adjust the value of Z to be $Z_n$, otherwise, $Z = Z_n$ |
| ClrHome | Clear display screen |
| Fix 1 | |
| Disp "A=" | "A" stands for intercept distance |
| 60abs (E-T) → U | U is the intercept distance |

```
Disp U
If (E-T)>0                          Computed Greater Away
Goto 1
Disp "MILES TO"                     Measured Greater Toward
Goto 2
Lbl 1
Disp "MILES AWAY"
Lbl 2
Disp "ZN"
Fix 0
Disp Z                              Z is the zenith angle ($Z_n$) in degrees
Disp "DEG."
Stop                                This ends the XCELPO program with the line of position
```

Program 7: SUNQUES

```
Prgm4                               GHADEC.☉ for the Sun
ClrHome                             Clear the display screen
Disp "SUN?"                         Is the Sun the sighted object?
Input Z
If Z ≠ 1                            If not do the star program
Prgm5                               GHADEC.S for 24 Stars
```

Program 8 ARC.EQ

```
sinEsinC + cosEcosCcosH             Return value to calling Program
```

Program 9 ALMA.DAT

```
ClrHome                             Clear the display screen
Disp "GHA1"                         Note to enter GHA of 1st body, M1
Pgm2                                Input data for "DEGREES" and "MINUTES", returns S
Ans → A                             Store GHA1 as A
Disp "DEC1"                         Note to enter Declination of M1
Pgm2                                Input data for "DEGREES" and "MINUTES", returns S
Ans → C                             Store DEC1 as C
```

Program 0 ANGLE.EQ

```
Cos⁻¹((sinE/(cosCsinL))-tanC/tanL)
```

APPENDIX 2

Sight Reduction Program

Use of the XCELPO Program

1. When the program is run by selecting Prgm and pressing the "Enter" key with Prgm1 (XCELPO) shaded, the program will dispaly "EX ALAMANAC?". All questions on the screen are answered with a "1" for "yes" and anything else for "no". If "1" is entered, the program next asks "LOP?", which is again answered with a 1 for yes and anything else for a no. The following table shows what happens with the four possible combinations of answers for these two questions.

| Almanac | LOP | Action |
   | --- | --- | --- |
   | 0 | 0 | Go to internal almanac for two passes, and skip to step 3 below. |
   | 0 | 1 | Go to internal program for one pass, and enter LOP program. |
   | 1 | 0 | Go to step 2 below. |
   | 1 | 1 | Enter LOP program. It will "call" for GHA1, DEC1 and HO1 from steps 2 and 3 below, and will end by calculating the LOP. |

2. From the current Nautical Almanac, input GHA and DEC for the two bodies with GHA1 and DEC1 corresponding to M1, the Western-most body of the two. For both GHA and DEC the program request "DEG." for an input of whole degrees, and "MIN." for minutes and tenths of a minute.* For southern declinations, enter minus the number of degrees and leave minutes normal.

3. Input Ho1 and Ho2 corrected from the sextant readings for the two bodies. Again, whole degrees and minutes—tenths of minutes are inputs to the program.

4. Input the quadrant number for $M_1$ according to the following diagram:

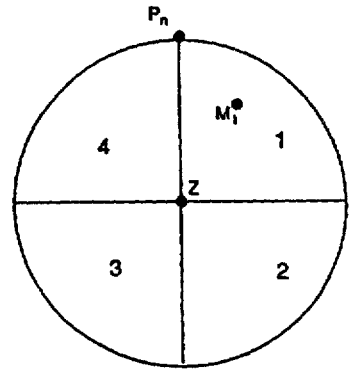

The diagram shows $M_1$ in quadrant 1. Note that you must face North and mentally divide the heavens into four quadrants to do the assignment. The assignment is approximate.

5. If $M_1$ is in quadrants 1 or 2, it is East of Z. A message will come on the screen asking if $M_2$ is North of $M_1$. Answer this with "1" for yes and anything else for "no".

6. If $M_1$ is in quadrants 3 or 4, the program will ask for the quadrant of $M_2$. Use the same quadrant numbering scheme as used for $M_1$ to input the information. NOTE that the two bodies must be within 30° to 150° of each other. The XCELPO program cannot do the impossible!

7. The program will calculate Latitude and Longitude of the observer at Z, and display the results on the screen.

* Degrees and tenths can be entered, but "0" must be entered for the "MIN." request.

APPENDIX 3
Sight Reduction Program
Internal Almanac Program

The following listing is in the TI-81 hand held processor. It was used to fit the GHA and DEC of the SUN information for a perpetual almanac found in Bowditch. By experiment, the fit was accomplished for GHA from January 1 to December 31 of the year following a leap year. The DEC information is based on the second year following a leap year, and it uses the same date information as the GHA portion uses.

Program 5 finds GHA and DEC for 24 stars, and it is listed beginning on page 4. It uses fixed values that are located in matrices inside the TI-81. The matrix values are then corrected for the year and date of the sight.

Program 4: GHADEC.☉ GHA and DEC for the Sun

| Code | Comment |
|---|---|
| 1 → X | Answer to Almanac question is no |
| Disp "YEAR" | Start gathering information for Perpetual Almanac |
| Input Y | Y is a four digit number such as 2001 |
| Disp "MONTH" | The month, M, is an integer from 1 - 12 for Jan. - Dec. |
| Input M | |
| Disp "DAY" | |
| Input D | The value of D ranges from 1 to 31 for the date of the month |
| Disp "TIME" | |
| Input T | T is UMT (GMT): HHMM.SS, where HH ranges from 0 to 23, MM ranges from 00 to 59, and SS ranges from 0 to 59 |
| FPart T → S | Fractional part of T is SS, the seconds stored in S |
| IPart T → T | Throw away the seconds and keep the integer part |
| FPart (T/100) → J | Fraction part of the new T is MM, the minutes stored in J |
| IPart (T/100) → H | Integer part of the new T is HH, the hours stored in H |
| 4FPart((Y-1972)/4) → ☉ | Year = 0 (leap), 1, 2 or 3 |
| IPart((Y-1972)/4) → I | Factor used to calculate the quadrennial correction on GHA |
| Y → V | V, the current year, is used in Star GHA and DEC corrections |
| ☉ → Y | |
| If Y=0 | |
| 4 → Y | Numbers years from 1-4, the leap year |
| 15(H + J/60 + S/3600) → T | Time-to-angle for GHA of Sun |
| IPART((367M-362)/12) → N | Days in current year for past months |
| If M>2 | Later than February |
| N-2 → N | The IPART calulation assumes 30 days in February |
| N+D → N | Add days of current month |
| If M>2 | Later than February |
| Goto A | Skip to A |
| If N-60 | |
| N=59 | February 29th of leap year Make year like normal |
| Lbl A | |
| N → ☉ | For use in the quadrennial correction, later |
| N+(Y-1)365 → N | To get continuous numbering of days over 4 years |

| | |
|---|---|
| If Y≠4 | Not a leap year |
| Goto A | |
| If Θ < 59 | Leap year, but before Feb. 28 |
| Goto B | |
| N+1→N | For months following February in a leap year |
| Θ+1→Θ | Also for Θ |
| If D>2 | Must be a later month |
| Goto B | N and Θ are OK |
| If D = 29 | Is it the 29th of February? |
| Goto B | |
| N-1→N | For January and February in a leap year use 1095 |
| Θ-1→Θ | Also for Θ |
| Lbl B | Start the GHA calculation |
| 365.25(Y-1)→F | Used to shift data for different years in $Y_1$ |
| If Y≠4 | Not leap year |
| Goto 1 | Skip the next operations |
| If M>10 | |
| 1461→F | Shift data to November and December of leap year |
| Lbl 1 | |
| $Y_1$ -.035e↑(-.0010214(N-59.75-F)$^2$) | $Y_1$ is calculated via the graphical section of the TI-81 |
| +.03e↑(-.0015116(N-77.75-F)$^2$) | These bump removers do not fit in the graphical |
| +.024e↑(-.0043595(N-105.75-F)$^2$) | section of the TI-81 |
| +.021e↑(-.013531(N-154.75-F)$^2$)→Q | |
| .06sin(((Θ-74)/15)π) | The quadrennial correction. This is the "moon wiggle" |
| If Θ<200 | |
| Ans +.2sin(((Θ-35)/100)π)+.18 | |
| +.14e↑(-.0136888(Θ-6)$^2$) | This is the main fit (with a bump) for D<200, July 19th |
| If Θ<200 | |
| Goto 2 | The fit is different for Θ≥200 |
| Ans +.2.4sin(((Θ-180)/150)π)-.16 | |
| If Θ≥335 | |
| Ans +.115+ | |
| .025sin(((Θ -338.5)/19.5)2π) | A fix on the fit for December (335 is Dec. 1 on an non-leap year) |
| Lbl 2 | |
| Q+1Ans/60+T+175→R | Return R to the main program as the GHA for the Sun |
| If R>360 | GHA is normally less than 360° |
| R-360→R | R is the value for GHA of the Sun. Continue for the DEC for the Sun. |
| N+T/360 | Fraction of day added to N to interpolate DEC |
| 23.442cos(((Ans-903)/365.25)2π) | The large sinewave extraction of the DEC data |
| +1.085e↑(-.0004(Ans-284.5-F)$^2$) | A series movable bump removers (by F) |
| +.645e↑(-.0005(Ans-65.5-F)$^2$) | |

$-.1e\char94(-.0014(Ans-.5-F)^2)$ $+.019e\char94(-.006(Ans-43.5-F)^2)$ $-.019e\char94(-.00234(Ans-196.5-F)^2)$ $+.019e\char94(-.00909(Ans-298.5-F)^2)$ $-.146e\char94(-.002(Ans-352.5-F)^2)$      DEC is done but needs the following correction:

Ans $-1/60(68\sin(((\Theta-153)/183)\pi)-.045$      The quadrennial correction major part for DEC $+.09e\char94(-.0003(\Theta-186)^2)$ $-.075e\char94(-.0023(\Theta-78)^2)$      Three standard distribution curves to remove "bumps"

$-.07e\char94(-.0008(\Theta-317)^2))\to Z$      DEC is Z returned to the calling program The equation in the graph memory of the TI-81:

$Y_1=9.1\cos(((N-308)/365.25)2\pi)$      A single cosine function for four years $+14.975e\char94(-.00018(N-129.75-F)^2)$      A big equalizer shifted by F to fit different years $-1.653e\char94(-.0007(N-12.25-F)^2)$      Low end bump remover (large)

$-.591e\char94(-.00067(N-246.75-F)^2)$      High end bump remover (large)

$-.066e\char94(-.00670345(N+121.25-F)^2)$ $-.171e\char94(-.0036756(N-43.75-F)^2)$ $+.132e\char94(-.0029199(N-90.75-F)^2)$ $+.087e\char94(-.0031716(N-172.75-F)^2)$ $-.029e\char94(-.014966(N-215.75-F)^2)$ $-.049e\char94(-.0055533(N-273.75-F)^2)$      Various "bump" removers, smoothing the data fit $+.028e\char94(-.028314(N+51.25-F)^2)$ $+.027e\char94(-.014648(N-43.75-F)^2)$

Program 5 GHADEC.S          <u>GHA and DEC for the Stars (the first part finds Aries)</u>

| | |
|---|---|
| M → X | Month in the row of matrix |
| If M > 6 | 6 is the maximum number of rows |
| M-6 → X | Go to higher set of rows |
| If Y=4 | Leap year is in matrix B |
| Goto 1 | |
| Y | Year is the column of the matrix (year is in 4-year cycle) |
| If M > 6 | |
| 2Y | |
| [A] (Ans, X) | Extract the value at Y or 2Y, X from matrix A |
| Goto 2 | The data is in the "Ans" register of the TI-81 |
| Lbl 1 | Get data from matrix B |
| 1 | |
| If M > 6 | |
| 2 | |
| [B](Ans, X) | Extract the value at (1 or 2), X from matrix B |
| Lbl 2 | |
| Ans + 15.0417H | |
| + 1/60(.9857D + .25J + .004S) → P | GHA of Aries corrected for Hour, Day, Minute and Second |
| If P > 360 | |
| P - 360 → P | |

This table shows the matrix entries for the GHA of Aries.

Table 1:

| Month | Year 1 | Year 2 | Year 3 | Year 4 |
|---|---|---|---|---|
| Jan. | 99.517 (row 1) (Col. 1) | 99.278 (Col. 3) | 99.04 (Col. 5) | 98.77 (row 1) (Col. 1) |
| Feb. | 130.073 | 129.835 | 129.595 | 129.325 |
| Mar. | 157.675 | 157.432 | 157.193 | 157.908 |
| April | 188.255 | 187.987 | 187.748 | 188.463 |
| May | 217.795 | 217.557 | 217.317 | 218.033 |
| June | 248.35 (row 6) | 248.112 | 247.872 | 248.706 |
| July | 277.92 (row 1) (Col. 2) | 277.682 (Col. 4) | 277.442 (Col. 6) | 278.158 (Col. 2) |
| Aug. | 308.475 | 308.237 | 307.997 | 308.713 |
| Sept. | 339.03 | 338.792 | 338.352 | 339.268 |
| Oct. | 8.6 | 8.36 | 8.122 | 8.838 |
| Nov. | 39.153 | 38.915 | 38.672 | 39.343 |
| Dec. | 68.434 (row 6) | 68.485 | 69.245 | 68.962 |
| Matrix A | | | | Matrix B |

The Star List is as follows:

| Star No. | Name | Mag. | Star No | Name | Mag. |
|---|---|---|---|---|---|
| 1 | Achernar | 0.6 | 13 | Dubhe | 2.0 |
| 2 | Acrux | 1.1 | 14 | Formalhaut | 1.3 |
| 3 | Aldebaran | 1.1 | 15 | Mirfak | 1.9 |
| 4 | Alkaid | 1.9 | 16 | Pollux | 1.2 |
| 5 | Altair | 0.9 | 17 | Procyon | 0.5 |
| 6 | Antares | 1.2 | 18 | Regulus | 1.3 |
| 7 | Arcturus | 0.2 | 19 | Rigel | 0.3 |
| 8 | Atria | 1.9 | 20 | Rigel Kentaurus | 0.1 |
| 9 | Betelgeuse | 0.1 to 1.2 | 21 | Sirius | -1.6 |
| 10 | Canopus | -0.9 | 22 | Spica | 1.2 |
| 11 | Capella | 0.2 | 23 | Suhail | 2.2 |
| 12 | Deneb | 1.3 | 24 | Vega | 0.1 |

This is a continuation of Program 5: GHADEC.S

| | |
|---|---|
| Disp "STAR" | Star numbers are above |
| Input S | The star number is in register S |
| S → R | S is manipulated, store in R temporarily |
| 3 | Column number |
| If R>6 | Max row is 6 |
| 4 | Next column number |
| Ans → Q | 3 or 4 in Q |
| If Q=4 | The second column number |
| S-6 → S | Renumber the rows to range from 1 to 6 |
| If R <13 | If the original value of the star number is less than 13, we're done |
| Goto C | If so, go to C, below |
| 5 | Column number |
| If R >18 | Star number greater than 18 |
| 6 | Use the last column number |
| Ans → Q | 5 or 6 in Q |
| R 12 → S | Renumber the rows to range from 1 to 6 |
| If Q = 6 | If the last column |
| R-18 → S | Renumber for that column |
| Lbl C | |

Table 2:

| Star No. | SHA | Star No. | SHA |
|---|---|---|---|
| 1 | 335.74856(row 1) (Col. 3) | 13 | 194.49792(row 1) (Col. 5) |
| 2 | 173.74384 | 14 | 15.97383 |
| 3 | 291.42286 | 15 | 309.422107 |
| 4 | 153.39059 | 16 | 244.09892 |
| 5 | 62.64573 | 17 | 245.54078 |
| 6 | 113.07892(row 6) | 18 | 208.2808 |
| 7 | 146.40368(row 1) (Col. 4) | 19 | 281.70272 (Col. 6) |
| 8 | 108.578159 | 20 | 140.692102 |
| 9 | 271.58781 | 21 | 259.02266 |
| 10 | 264.16733 | 22 | 159.07279 |
| 11 | 281.345111 | 23 | 223.25855 |
| 12 | 49.88151(row 6) | 24 | 81.00351 |

Matrix B(last 2 or 3 digits of decimal is a neg. correction)

| | |
|---|---|
| Lbl C | Find the matrix values at the computed addresses |
| $[B](Q,S) \rightarrow R$ | SHA of selected Star |
| $[C](Q,S) \rightarrow Z$ | Dec of selected star |
| Fpart (1000R) $\rightarrow$ Q | Find the correction factor for SHA |
| If Fpart(100Q) > 0 | If there are three digits |
| 10Q $\rightarrow$ Q | Make it times ten (1.xx rather than .1xx) |
| Fpart(1000R) | |
| R - Ans/1000 $\rightarrow$ R | Remove the correction from the SHA value |
| R - (1/60)(V + M/12 - 1972)Q + P $\rightarrow$ R | Correct with the Year difference (plus a fraction) and add GHA of Aries |
| If R > 360 | |
| R - 360 $\rightarrow$ R | GHA star is less than 360 degrees |
| Fpart(1000Z) $\rightarrow$ U | |
| Z - U/1000 $\rightarrow$ Z | Drop the correction from the DEC value |
| Z + (1/60)(V + M/12 - 1972)(U - .33) $\rightarrow$ Z | Correct the DEC value including the .33 fudge |

Table 3:

| Star No. | DEC | Star No. | DEC |
|---|---|---|---|
| 1 | -57.37809(row 1) (Col. 3) | 13 | 61.90365(row 1) (Col. 5) |
| 2 | -62.94366 | 14 | -29.77201 |
| 3 | 16.45545 | 15 | 49.76354 |
| 4 | 49.45303 | 16 | 28.09518 |
| 5 | 8.79349 | 17 | 5.29817 |
| 6 | -26.37246(row 6) | 18 | 12.10504 |
| 7 | 19.32702(row 1) (Col. 4) | 19 | -8.23326 (Col. 6) |
| 8 | -68.97844 | 20 | -60.72058 |
| 9 | 7.40334 | 21 | -16.67741 |
| 10 | -52.68036 | 22 | -11.01764 |
| 11 | 45.97239 | 23 | -43.31857 |
| 12 | 45.18055(row 6) | 24 | 38.75739 |

Matrix C (last 2 digits of fraction is a correction + .33)

The values of R and Z are returned to the calling program